US012608577B2

(12) United States Patent
Moncada

(10) Patent No.: US 12,608,577 B2
(45) Date of Patent: Apr. 21, 2026

(54) MULTI-ACCOUNT SMART CARD APPARATUSES AND DEVICES

(71) Applicant: Camilo Moncada, Gresham, OR (US)

(72) Inventor: Camilo Moncada, Gresham, OR (US)

( * ) Notice: Subject to any disclaimer, the term of this patent is extended or adjusted under 35 U.S.C. 154(b) by 0 days.

(21) Appl. No.: 19/334,033

(22) Filed: Sep. 19, 2025

(65) Prior Publication Data

US 2026/0017479 A1     Jan. 15, 2026

Related U.S. Application Data

(62) Division of application No. 18/135,008, filed on Apr. 14, 2023, now Pat. No. 12,443,820.

(51) Int. Cl.
  *G06K 19/077* (2006.01)
  *G06K 19/07* (2006.01)

(52) U.S. Cl.
  CPC ... *G06K 19/0725* (2013.01); *G06K 19/07722* (2013.01); *G06K 19/07779* (2013.01)

(58) Field of Classification Search
  CPC ................... G06K 19/07762; G06K 19/07779
  USPC ........................................ 235/492
  See application file for complete search history.

(56) References Cited

U.S. PATENT DOCUMENTS

| | | | | | |
|---|---|---|---|---|---|
| 8,061,620 | B2 * | 11/2011 | Phillips | ................ | G06K 19/005 |
| | | | | | 340/572.1 |
| 8,336,785 | B2 * | 12/2012 | Phillips | ................ | G06K 19/005 |
| | | | | | 340/572.1 |
| 8,651,346 | B1 * | 2/2014 | Williams | ............. | A44C 5/0015 |
| | | | | | 224/267 |
| 8,851,386 | B2 * | 10/2014 | Phillips | .................. | H05K 9/002 |
| | | | | | 235/451 |
| 9,429,991 | B1 * | 8/2016 | Ruffing | ................. | G06F 1/1635 |
| 10,956,804 | B2 * | 3/2021 | Schnippering | ... | G06K 19/07762 |
| 2008/0061150 | A1 * | 3/2008 | Phillips | ............ | G06K 19/07769 |
| | | | | | 705/41 |
| 2008/0061151 | A1 * | 3/2008 | Phillips | ............ | G06K 19/07716 |
| | | | | | 235/492 |
| 2009/0065587 | A1 * | 3/2009 | Phillips | ................ | G06Q 20/105 |
| | | | | | 705/41 |
| 2010/0072283 | A1 * | 3/2010 | Phillips | ............ | G06K 19/07749 |
| | | | | | 235/495 |
| 2011/0263292 | A1 * | 10/2011 | Phillips | ................. | H04M 17/00 |
| | | | | | 235/492 |
| 2012/0116903 | A1 * | 5/2012 | Phillips | ................ | G06Q 20/204 |
| | | | | | 156/60 |

(Continued)

*Primary Examiner* — Paultep Savusdiphol
(74) *Attorney, Agent, or Firm* — Cera Oh; Joseph Mogavero

(57) ABSTRACT

A smart card includes a front surface plate including a linear cutout. An electrical connector is disposed on the front surface plate and extends into the linear cutout. The electrical connector is coupled to and movable along a communication interface trace through the linear cutout. A middle plate is positioned adjacent to the front surface plate, the middle plate including a cavity. A back surface plate is positioned adjacent to the middle plate. The cavity includes a first portion to hold one or more first memory components and a second portion to hold one or more second memory components. The electrical connector selectively electrically couples a first memory component of the one or more first and second memory components to the communication interface trace.

4 Claims, 13 Drawing Sheets

(56) References Cited

U.S. PATENT DOCUMENTS

| | | | |
|---|---|---|---|
| 2014/0027521 A1* | 1/2014 | Pedicano | G09F 3/20 |
| | | | 235/492 |
| 2015/0109106 A1* | 4/2015 | Gomez | G06K 19/0723 |
| | | | 340/10.1 |
| 2015/0109107 A1* | 4/2015 | Gomez | G06K 19/045 |
| | | | 340/10.1 |
| 2020/0005113 A1* | 1/2020 | Schnippering | G06K 19/07777 |
| 2020/0012912 A1* | 1/2020 | Klimt | G06K 19/0723 |
| 2023/0169297 A1* | 6/2023 | Atkins | G06K 19/06196 |
| | | | 235/492 |
| 2023/0169299 A1* | 6/2023 | Vadrevu | G06K 19/07722 |
| | | | 235/492 |

* cited by examiner

MULTI-ACCOUNT SMART CARD APPARATUSES AND DEVICES

CROSS-REFERENCE TO RELATED APPLICATION

This application is a divisional application, and claims the benefit, of U.S. Non-Provisional patent application Ser. No. 18/135,008, filed Apr. 14, 2023, which is incorporated herein by reference.

TECHNICAL FIELD

Embodiments of the disclosure relate generally to financial account cards, and more specifically, related to multi-account smart card apparatuses and devices.

BACKGROUND

Financial cards, to include debit and credit cards, have developed over time. These cards generally hold information related to payment through a single financial account. Some financial cards enable multiple ways to connect to the same financial account to complete payment, however. These include, for example, a magnetic swipe strip, a chip (that can be read by a chip reader), and a contactless reader that enables tap payment, e.g., via radio frequency identification (RFID) technology. Any sort of integration of multiple financial accounts on the same card is less common, as such integration brings challenges of keeping the financial accounts separate and secure from each other or one financial account being detected when another financial account was intended for payment.

BRIEF DESCRIPTION OF THE DRAWINGS

A more particular description of the disclosure briefly described above will be rendered by reference to the appended drawings, where like components will be similarly numbered. Understanding that these drawings only provide information concerning typical embodiments and are not therefore to be considered limiting of its scope, the disclosure will be described and explained with additional specificity and detail through the use of the accompanying drawings.

DETAILED DESCRIPTION

By way of introduction, the present disclosure relates to multi-account smart card apparatuses and devices. To overcome the deficiencies in the art that involve security and practical challenges with incorporating multiple financial accounts on a single smart card, the present smart card apparatuses and devices incorporate features that enable secure reading of a single financial account while preventing access of one or more additional financial accounts that are also accessible on the same apparatus or device. According to the disclosed embodiments, these features include a combination of switching electronics, mechanical features, and available memory components or miniature smart cards that are selectively chosen via the switching electronics. Thus, by employing a combination of mechanical and electrical features that will be discussed with reference to the Figures, the disclosed apparatuses and devices overcome the deficiencies in the current art when incorporating multi-account access on a single smart card, apparatus, or device such as a bracelet-shaped or ring-shaped smart card apparatus or device.

Figure 1A:
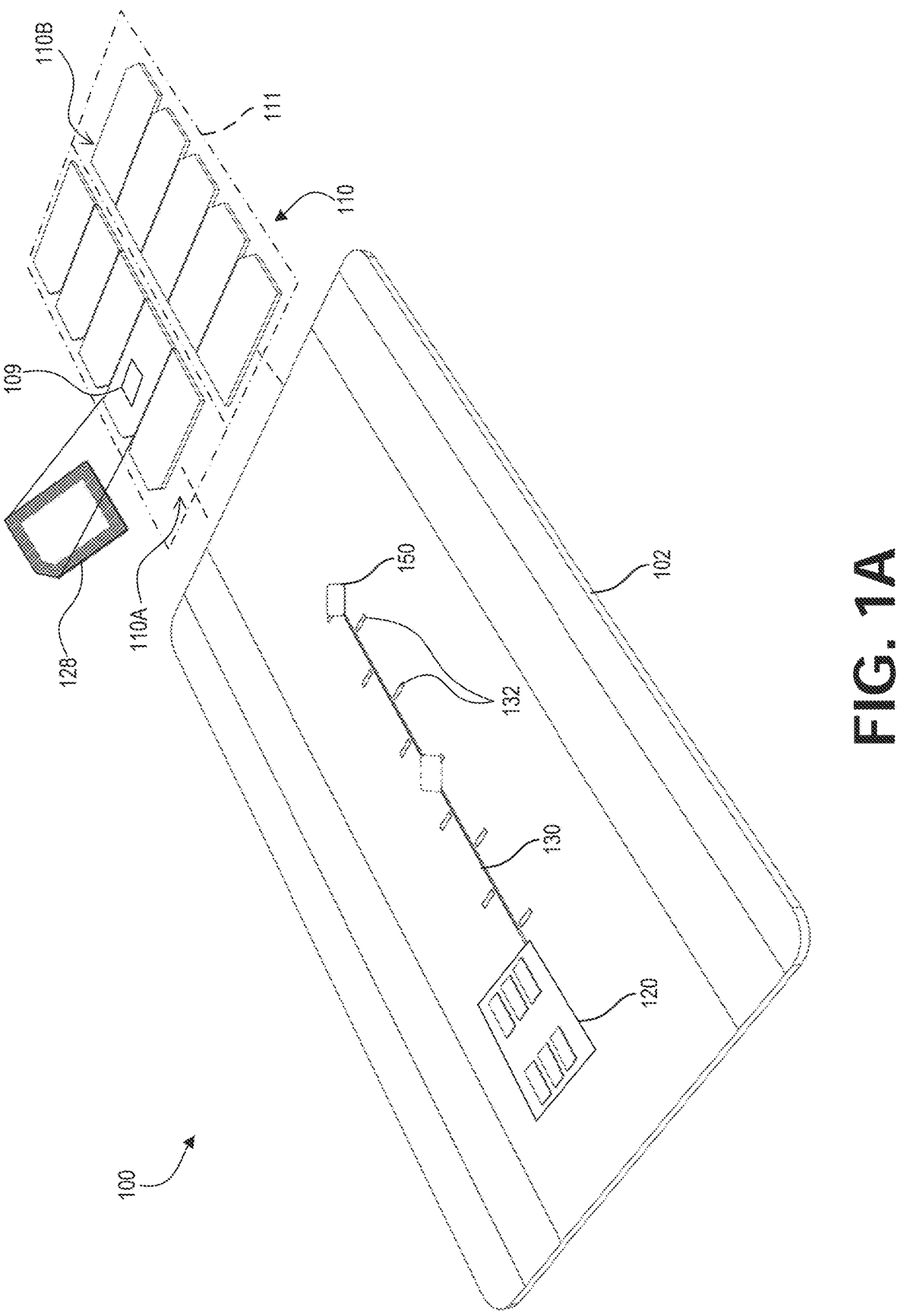
FIG. 1A is perspective view of a smart card with memory components in an exploded view and that are variably selectable using a movable electrical connector according to various embodiments.
Figure 1B:
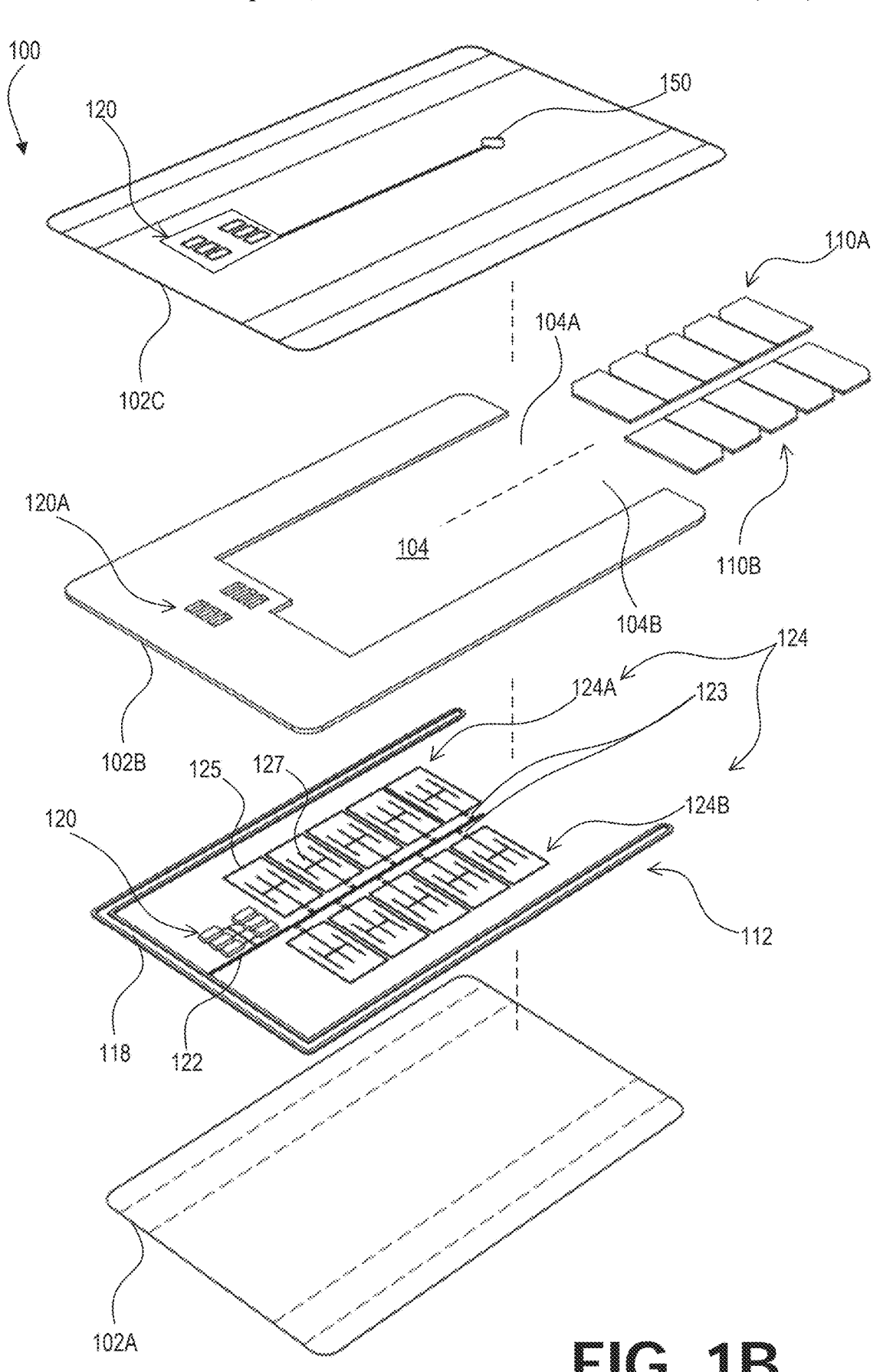
FIG. 1B is an exploded perspective view of the smart card of FIG. 1A according to various embodiments.
Figure 1C:
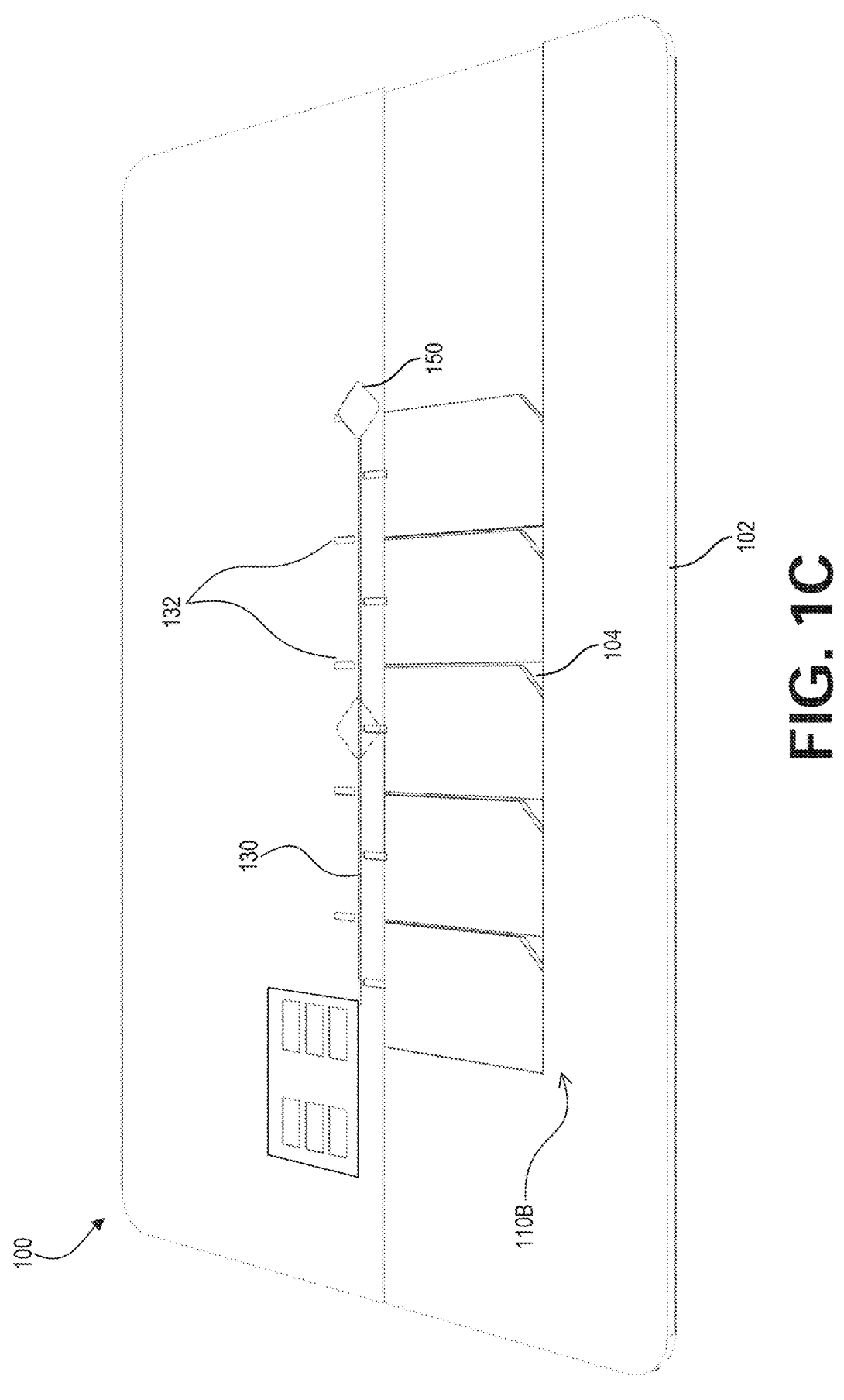
FIG. 1C is a side, partial cut-away, perspective view of the smart card of FIG. 1A illustrating the electrical connector in two different possible positions to select different memory components according to an exemplary embodiment.
Figure 1D:
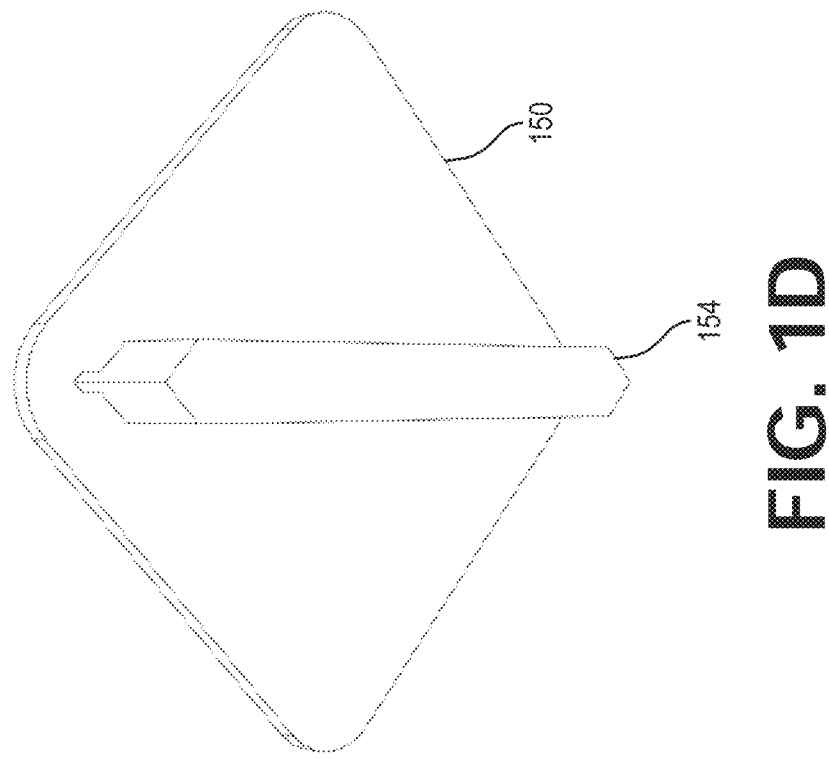
FIG. 1D is a bottom perspective view of the electrical connector as illustrated in FIGS. 1A-1C according to at least one embodiment.

FIG. 1A is perspective view of a smart card 100 with memory components 110 in an exploded view and that are variably selectable using a movable electrical connector 150 according to various embodiments. FIG. 1B is an exploded perspective view of the smart card 100 of FIG. 1A according to various embodiments. FIG. 1C is a side, partial cut-away, perspective view of the smart card 100 of FIG. 1A illustrating the electrical connector 150 in two different possible positions to select different memory components 110 according to an exemplary embodiment. FIG. 1D is a bottom perspective view of the electrical connector 150 as illustrated in FIGS. 1A-1C according to at least one embodiment.

In at least some embodiments, the smart card 100 includes the electrical connector 150, a multi-layered body 102 having an integrated circuit (IC) chip 120, a linear cutout 130, and a plurality of slots 132 positioned near and along the linear cutout 130. As illustrated in FIG. 1B, in embodiments, the multi-layered body 102 includes a back surface plate 102A, a middle plate 102B, and a front surface plate 102C. In at least one embodiment, the front surface plate 102C includes the linear cutout 130 and the plurality of slots 132. In other embodiments, although not illustrated, the back surface plate 102A includes the linear cutout 130 and the plurality of slots 132, and thus, designation as the "front" or "back" of the smart card 100 is unimportant to the orientation of the various features discussed herein.

In these embodiments, the middle plate 102B is positioned adjacent to the front surface plate 102C and includes a cavity 104. In embodiments, the cavity 104 includes a first portion 104A to hold one or more first memory components 110A and a second portion 104B to hold one or more second memory components 110B of the memory components 110. For example, in some embodiments, the first portion 104A and the second portion 104B is each configured to hold at least two memory components, at least four memory components, at least five memory components, or the like.

In some embodiments, the smart card 100 optionally includes a carriage 111 (FIG. 1A) configured to hold the one or more first memory components 110A and the one or more second memory components 110B and that is slidably insertable into the cavity 104 formed by the middle plate 102B. In various embodiments, the carriage 111 forms an open-ended recess (e.g., on an edge thereof) corresponding to the linear cutout 130 of the front surface plate 102C. With additional reference to FIGS. 1B-1C, in some embodiments, the memory components 110 themselves are slidably insertable within the cavity 104, e.g., and are thus each replaceable.

In various embodiments, each memory component 110 includes an IC chip 109 and an antenna 128 (e.g., a coil or inductor), illustrated in FIG. 1A on only one memory component by way of example. In some embodiments, the antenna 128 is located on an underside of each memory component 110 and the IC chip 109 is located on a topside of each memory component 110, although vice versa is also possible. In embodiments, the IC chip 109 is powered and communicates data through a type of induction with another antenna on the smart card 100 (discussed below), such as via electromagnetic radiation that modulates radio frequency waves with data. For example, induction is often performed via positioning two coils near each other.

More specifically, in some embodiments, each memory component 110 is a mini smart card integrated within the larger smart card 100 device that stores financial account information capable of being communicated from the smart card 100 to complete a financial transaction. In various embodiments, the IC chip 109 of each memory component 110 (or mini smart card) stores account information of a different financial account that is readable when activated or powered, e.g., either by RFID (or near-field communication (NFC)) or via EMV chip reading of the IC chip 109. In embodiments, EMV chip reading of the IC chip 109 is made accessible externally by the IC chip 120, e.g., a centralized IC chip 120 acting as a communication interface for all the mini smart cards, which will be explained in more detail. In this way, the smart card 100 facilitates swapping out the memory components 110 in order to replace old, expired, or compromised accounts with new accounts, and/or to expand on the currently-accessible accounts to obviate the need to purchase additional financial cards to support such additional financial accounts. In embodiments, the middle plate 102B includes rectangular voids 120A through which different IC chips are insertable, e.g., to support various different EMV financial accounts.

Figure 2A:
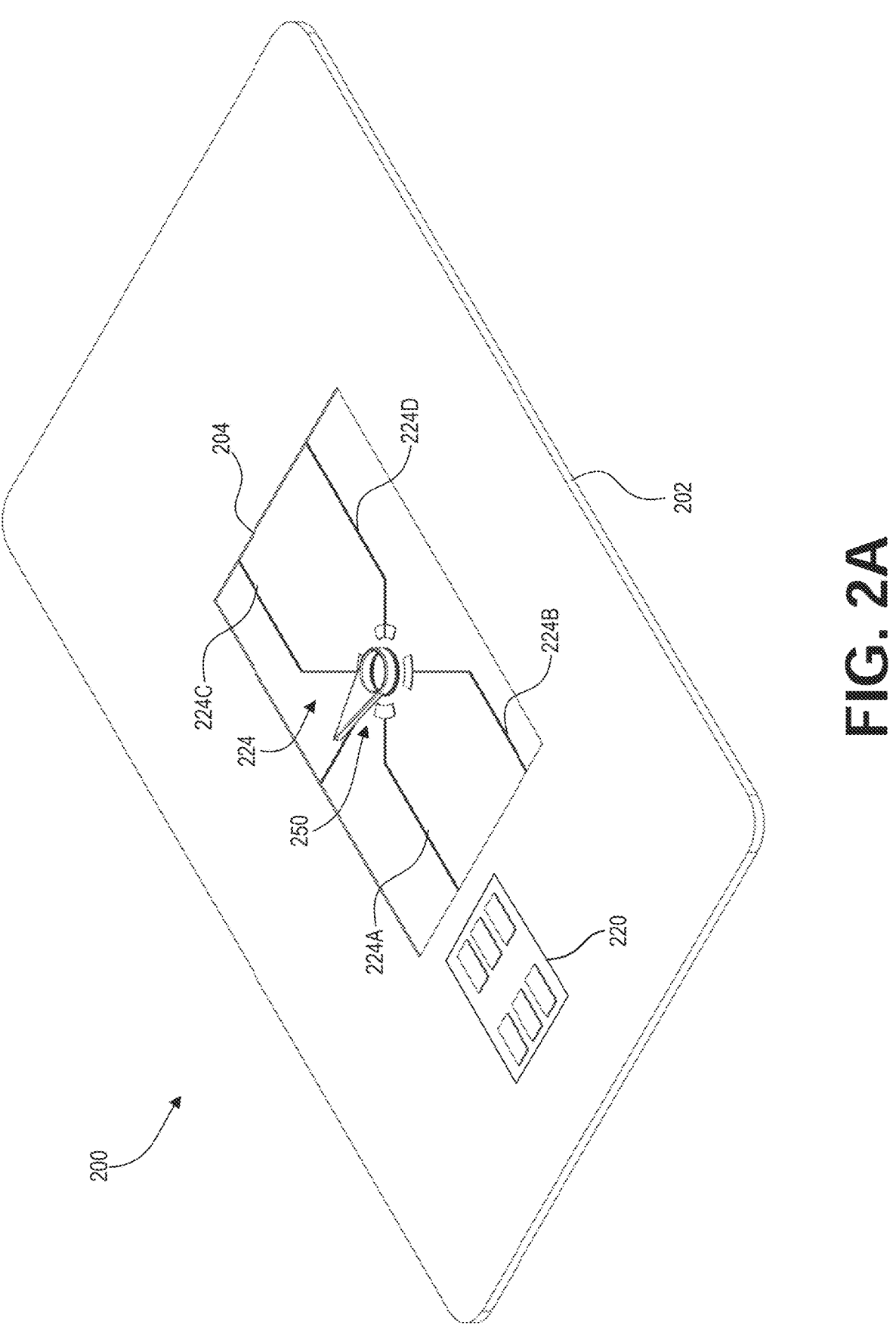
FIG. 2A is a perspective view of a smart card in which memory components are selectable via an electrical dial switch according to various embodiments.
Figure 2B:
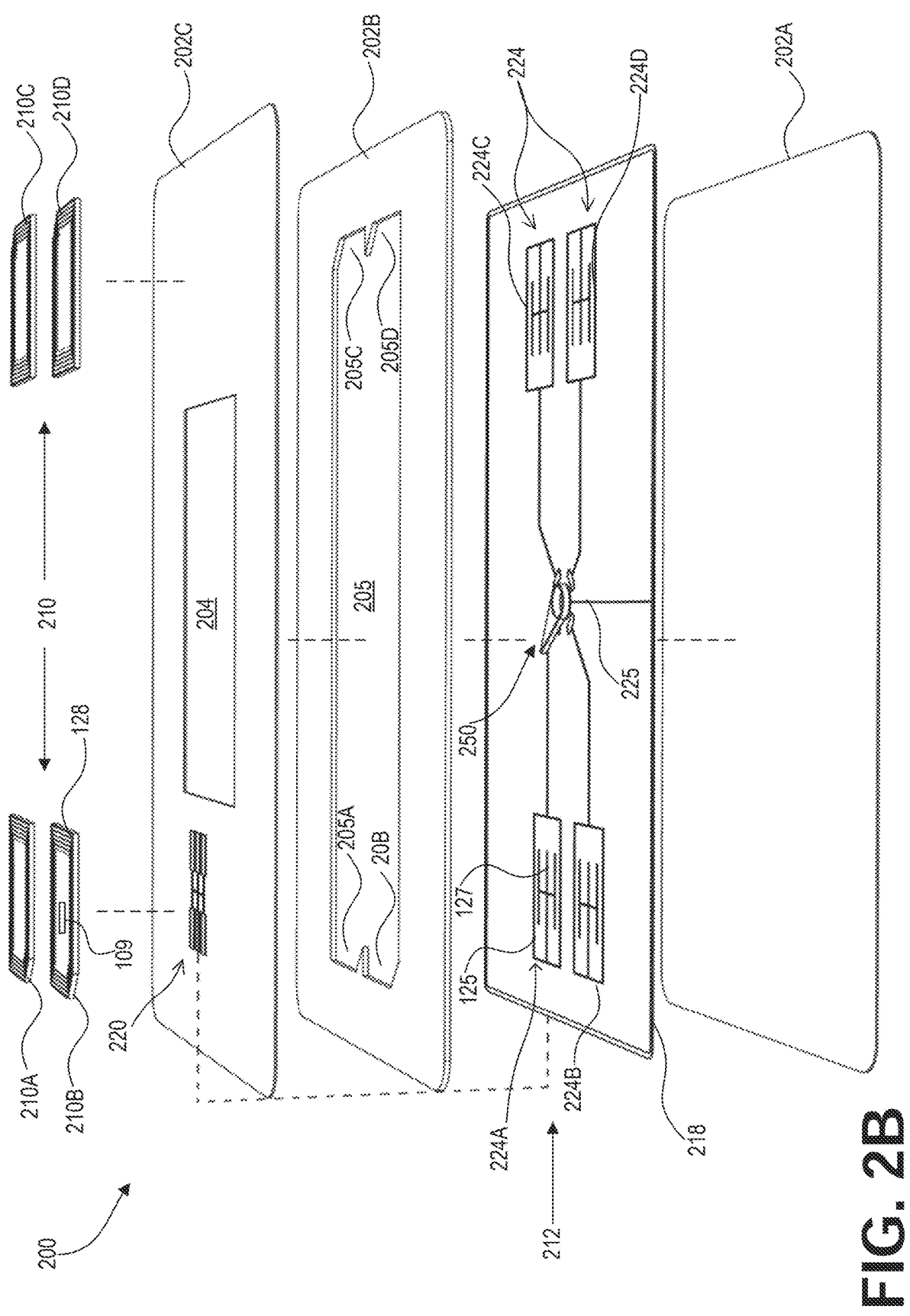
FIG. 2B is an exploded perspective view of the smart card of FIG. 2A according to various embodiments.

In various embodiments, with additional reference to FIG. 2B, communication circuitry 112 is disposed on the back surface plate 102A (e.g., an inner surface of the back surface plate 102A) and is thus positioned between the back surface plate 102A and the middle plate 102B. In embodiments, the communication circuitry 112 includes an antenna coil 118 (e.g., a dipole antenna), the IC chip 120 (or multiple IC chips), a communication interface trace 122 coupled to the IC chip 120 and the antenna coil 118, and a plurality of antennas 124 selectively coupled to the communication interface trace 122, all which facilitate contactless communication according to one or more wireless communication technologies, e.g., RFID/NFC or EMV chip reading.

In some embodiments, the antenna coil 118 is coupled to the communication interface trace 122 and located outside of the cavity 104, e.g., along a periphery of the smart card 100 to provide a sufficiently strong electromagnetic field for RFID and/or NFC communication. In embodiments, the IC chip 120 and the antenna coil 118 are configured to communicate with a transaction terminal according to a wireless communication technology, e.g., in order to complete a transaction initiated by the transaction terminal with reference to the selected financial account of the user.

In embodiments, the plurality of antennas 124 includes a first set of antennas 124A corresponding to and configured to selectively power the one or more first memory components 110A and a second set of antennas 124B corresponding to and configured to selectively power the one or more second memory components 110B. In embodiments, therefore, each antenna of the first and the second sets of antennas 124A and 124B is disposed on the back surface plate 102A between the communication interface trace 122 and each of a plurality of locations corresponding to the one or more first memory components 110A and the one or more second memory components 110B, respectively. More specifically, in disclosed embodiments, each antenna of the first plurality of antennas 124 is adjacent to a location for a respective memory component 110 of the one or more first memory components 110A or the one or more second memory components 110B.

In various embodiments, each antenna of the plurality of antennas 124 includes a wire loop 125 adapted to electromagnetically communicate with the antenna coil 118 using an electromagnetic form of communication such as RFID or NFC. In some embodiments, each antenna of the plurality of antennas 124 also includes a dipole antenna structure 127 to transfer data from the selected memory component 110 to the IC chip 120 (or one of the IC chips) configured to communicate via EMV technology on the smart card 100. In embodiments, whether the wire loop 125 or the dipole antenna structure 127 is employed depends on how the smart card 100 is deployed by a user to initiate a financial transaction.

In some embodiments, there are a plurality of gaps 123 between respective antennas of the plurality of antennas 124 and the communication interface trace 122. In embodiments, the electrical connector 150 is disposed on the front surface plate 102C and extends into the linear cutout 130, e.g., has a metal protrusion 154 that is sized for the linear cutout 130 and capable of protruding into a selected gap of the plurality of gaps 123. For example, in one embodiment, the electrical connector 150 is coupled to and movable along a communication interface trace 122 through the linear cutout 130.

In at least some embodiments, the linear cutout 130 exposes the communication interface trace 122 and the plurality of antennas 124. In embodiments, the electrical connector 150, which can physically move along the linear cutout 130, selectively closes a gap of the plurality of gaps 123 that electrically couples, to the communication interface trace 122, an antenna 124 that is adjacent to the selected memory component 110. For example, in at least one embodiment, when the electrical connector 150 is moved to a position (or location) to select a particular memory component 110, the metal protrusion 154 of the electrical connector 150 selectively closes a gap of the plurality of gaps 123, which completes the electrical path between the antenna 124 and the communication interface trace 122. In this way, the electrical connector 150 is to selectively electrically couple a memory component 110 of the one or more first and second memory components 110A and 110B to the communication interface trace 122, e.g., by being powered by the selected antenna 124.

Figure 2C:
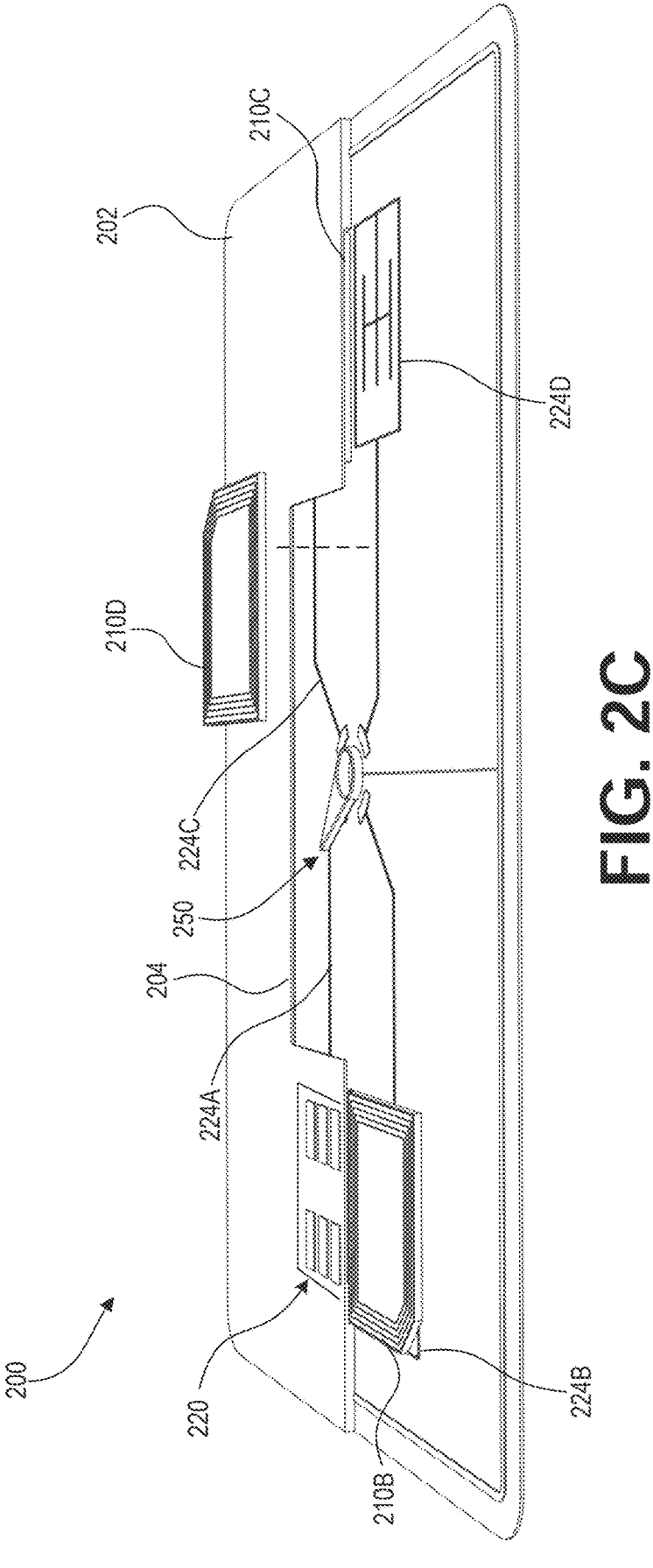
FIG. 2C is a cut-away, perspective view of the smart card of FIG. 2A according to an exemplary embodiment.

FIG. 2A is a perspective view of a smart card 200 in which memory components 210 are selectable via an electrical dial switch 250 according to various embodiments. FIG. 2B is an exploded perspective view of the smart card 200 of FIG. 2A according to various embodiments. FIG. 2C is a cut-away, perspective view of the smart card 200 of FIG. 2A according to an exemplary embodiment. In at least some embodiments, with reference to FIGS. 2A-2C, the smart card 200 includes the electrical dial switch 250, a multi-layered body 202 having a IC chip 220 (or multiple chips), and communication circuitry 212 including a plurality of antennas 224 coupled to the electrical dial switch 250.

As illustrated in FIG. 2B, in at least some embodiments, the multi-layered body 202 includes a back surface plate 202A, a middle plate 202B, and a front surface plate 202C. In embodiments, the front surface plate 202C includes or forms a cutout 204. In other embodiments, although not illustrated, the back surface plate 202A includes or forms the cutout 204, and thus, designation as the "front" or "back" of the smart card 200 is unimportant to the orientation of the various features discussed herein. In various embodiments, the IC chip 220 is disposed on the front surface plate 202C.

In various embodiments, the middle plate 202B is positioned adjacent to the front surface plate 202C and includes an opening 205 defining a plurality of cavities, which are configured to hold a plurality of memory components 210. For example, the opening 205 may include a first cavity 205A to hold a first memory component 210A, a second cavity 205B to hold a second memory component 210B, a third cavity 205C to hold a third memory component 210C, and a fourth cavity 205D to hold a fourth memory component 210D. Thus, the opening 205 of the middle plate 202B may include at least four cavities, each cavity configured to hold a memory component.

In at least some embodiments, each memory component of the plurality of memory components 210 is slidably insertable into a cavity of the plurality of cavities defined by the opening 205, e.g. after being passed through the cutout 204 (see FIG. 2C). Each memory component 210, for example, includes information or data that is readable, when activated or powered, in order to provide secure access to a different financial account of a user, similarly as was discussed with reference to the memory components 110 of FIGS. 1A-1C. Thus, in this way, the smart card 200 facilitates swapping out the memory components 210 in order to replace old, expired, or compromised accounts with new accounts, and/or to expand on the currently-accessible accounts to obviate the need to purchase additional financial cards to support such additional financial accounts.

With additional reference to FIG. 2B, in these embodiments, the back surface plate 202A is positioned adjacent to the middle plate 202B. In some embodiments, the smart card 200 includes communication circuitry 212 disposed on the back surface plate 202A (e.g., an inner side of the back surface plate 202A) that facilitates contactless communication according to one or more wireless communication technologies through the IC chip 220 (or multiple IC chips). In embodiments, the electrical dial switch 250 is also disposed on the back surface plate 202A and extends into the cutout 204 of the front surface plate 202C, thus also passing through the opening 205 in the middle plate 202B. In at least some embodiments, the communication circuitry 212 includes a communication interface trace 225 electrically coupled to the electrical dial switch 250 and the IC chip 220. The communication circuitry 212 may also include an antenna coil 218 coupled to the communication interface trace 225 that is outside the cutout 204 and located around the periphery of the smart card 200. In embodiments, the IC chip 220 and the antenna coil 218 are configured to communicate with a transaction terminal according to a wireless communication technology, e.g., in order to complete a transaction initiated by the transaction terminal with reference to the selected financial account of the user.

In embodiments, the communication circuitry 212 also includes a plurality of antennas 224 disposed on the back surface plate 202A and coupled to the electrical dial switch 250. In some embodiments, each antenna 224 is located adjacent to a memory component of the plurality of memory components 210 and the electrical dial switch 250 is to selectively couple an antenna of the plurality of antennas 224 to the communication interface trace 225 to activate a selected memory component that is adjacent to the coupled antenna.

In at least some embodiments, any memory component that is employed may be positioned within a cavity of the plurality of cavities that is located over a corresponding antenna 224. In these embodiments, the electrical dial switch 250 is to selectively couple (e.g., by rotating the electrical dial switch 250 to) the antenna of the plurality of antennas 224 to the antenna coil 218 or to the IC chip 220. In embodiments, each memory component of the plurality of memory components 210 stores information associated with a different financial account that is transferred over the communication interface trace 225 when an adjacent antenna of the plurality of antennas 224 is selected by the electrical dial switch 250.

More specifically, in these embodiments, the first memory component 210A, if present, is located in the first cavity 205A above a first antenna 224A of the plurality of antennas 224. In these embodiments, the second memory component 210B, if present, is located in the second cavity 205B above a second antenna 224B of the plurality of antennas 224. In these embodiments, the third memory component 210C, if present, is located in the third cavity 205C above a third antenna 224C of the plurality of antennas 224. In these embodiments, the fourth memory component 210D, if present, is located in the fourth cavity 205D above a fourth antenna 224D of the plurality of antennas 224.

In various embodiments, each antenna of the plurality of antennas 224 includes the wire loop 125 (FIG. 1B) adapted to electromagnetically communicate with the antenna coil 218 using an electromagnetic form of communication such as RFID or NFC. In some embodiments, each antenna of the plurality of antennas 224 also includes the dipole antenna structure 127 (FIG. 1B) to transfer data from the selected memory component 110 to the IC chip 120 (or one of the IC chips) configured to communicate via EMV technology on the smart card 100. In embodiments, whether the wire loop 125 or the dipole antenna structure 127 is employed depends on how the smart card 200 is deployed by a user to initiate a financial transaction.

In embodiments, when an antenna 224 is powered, the corresponding memory component 210 (e.g., a coil disposed on the corresponding memory component 210) is radiated electromagnetically with the antenna 224, enabling data to be passed through the antenna 224 from the memory component 210, through the communication interface trace 225, and to either the antenna coil 218 or the IC chip 220. In at least some embodiments, the electrical dial switch 250 selectively couples an antenna of the plurality of antennas 224 to the communication interface trace 225, which communicates that data to the IC chip 220 or out of the antenna coil 218, for example, to a transaction terminal.

Figure 3A:
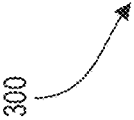
FIG. 3A is a device shaped to function as a bracelet that incorporates mini smart card features according to various embodiments.
Figure 3B:
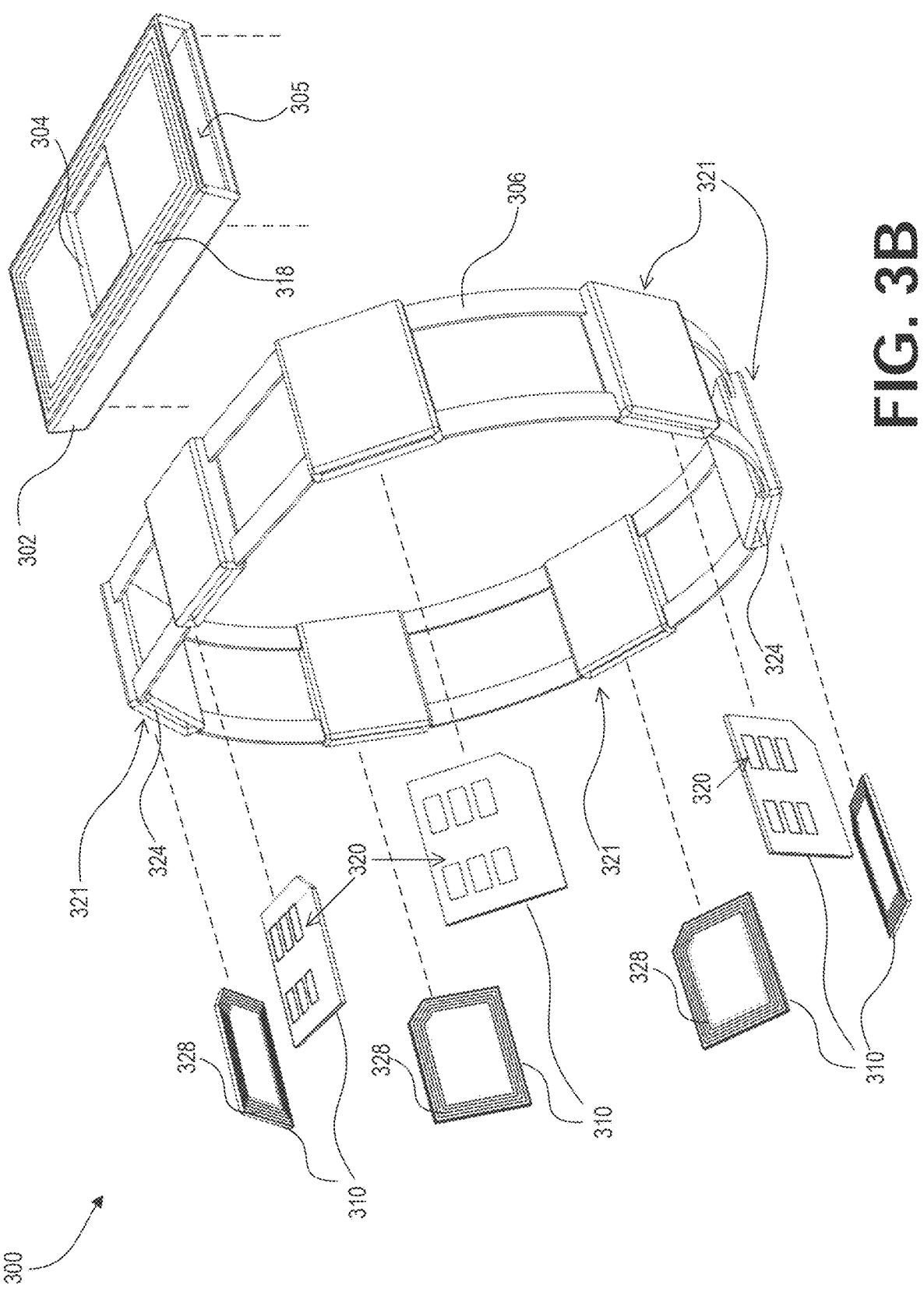
FIG. 3B is an exploded, perspective view of the device of FIG. 3A, illustrating how individual mini smart cards are insertable according to at least one embodiment.
Figure 3C:
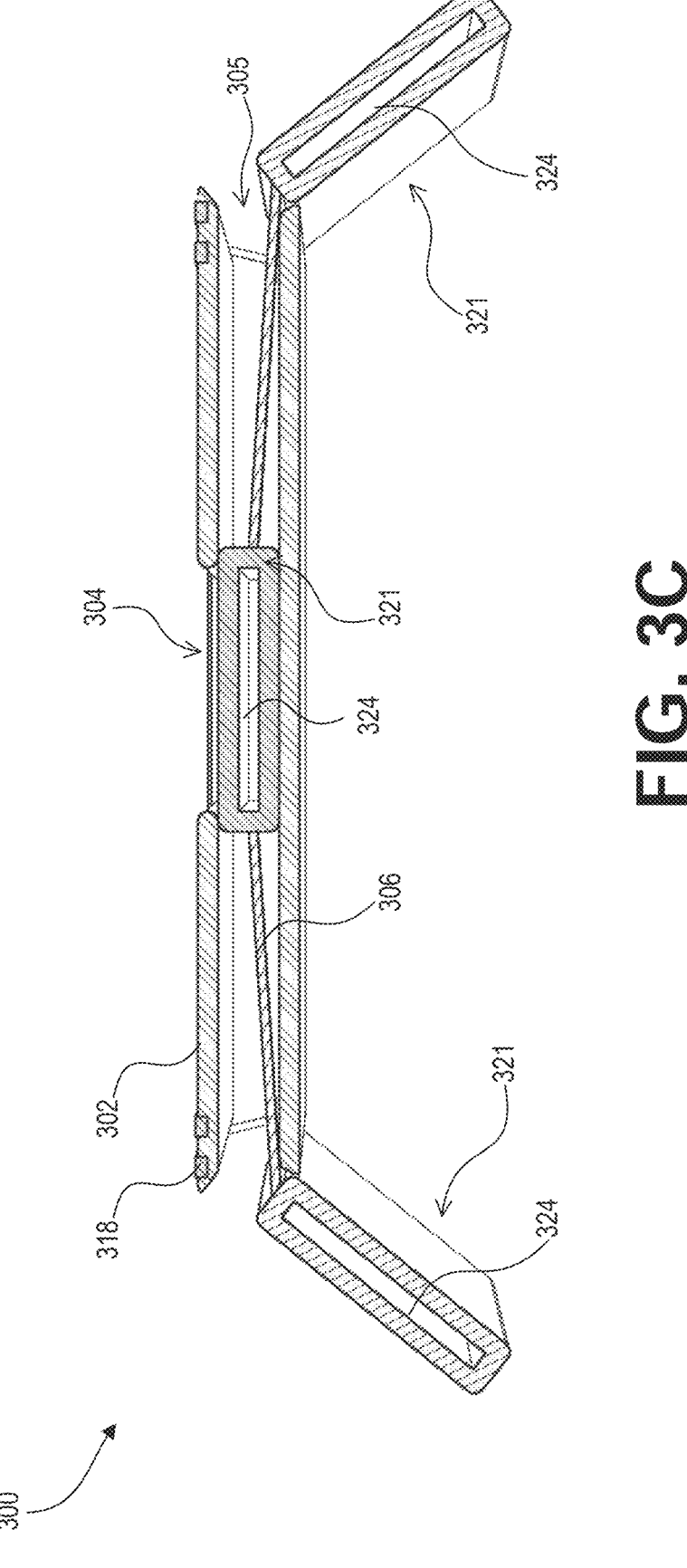
FIG. 3C is a side view of the device of FIG. 3A according to an exemplary embodiment.

FIG. 3A is a device 300 (or apparatus) shaped to function as a bracelet that incorporates mini smart card features according to various embodiments. FIG. 3B is an exploded, perspective view of the device of FIG. 3A, illustrating how individual mini smart cards are insertable according to at least one embodiment. FIG. 3C is a side view of the device of FIG. 3A according to an exemplary embodiment. The device 300 includes a housing 302 that is open at ends thereof (e.g., includes an opening 305 at each end) and includes a cutout region 304 at a top of the housing 302. In embodiments, the device 300 further includes a circular band 306. In some embodiments, the circular band 306 includes or is composed of a first ring 306A and a second ring 306B.

In various embodiments, the device 300 includes a plurality of card holders 321 attached to the circular band 306, e.g., to each of the first ring 306A and the second ring 306B. In at least some embodiments, each card holder 321 of the plurality of card holders 321 includes a cavity 324 to hold a mini smart card 310 (or memory component) having an integrated circuit (IC) chip 320 disposed on a first side (e.g., an outside) and a first metal coil 328 disposed on a second side (e.g., an inside) of the mini smart card 310. In these embodiments, the circular band 306 and the plurality of card holders 321 are configured to slidably pass through the housing 302 such that a respective card holder of the plurality of card holders 321 is retained at the cutout region 304 within the housing 302. In some embodiments, a first side of each card holder 321 is attached to the first ring 306A and a second side of each card holder is attached to a second ring 306B of the circular band 306.

In at least some embodiments the housing 302 includes a second metal coil 318 disposed on a top of the housing 302, the second metal coil 318 to electromagnetically communicate with the first metal coil 328 of a respective mini smart card 310 within the respective card holder 321 to activate an account that resides within the IC chip 320 of the respective mini smart card 310. In embodiments, each of the first metal coils 328 and the second metal coil 318 includes multiple concentric coils that function as an antenna at a particular length to match in wireless frequency. In embodiments, to electromagnetically communicate includes employing near-field communication (NFC) or radio frequency identification (RFID) communication, or other type of contactless communication, such as EMV reading technology with reference to any IC chip 320 residing on a mini smart card.

In some embodiments, the device 300 includes a plurality of mini smart cards 310 where each mini smart card of the plurality of mini smart cards 310 is located within one of the plurality of card holders 321 and stores information on the IC chip 320 associated with a different financial account. Each mini smart card 310 may be slidably insertable into a respective card holder 321. In embodiments, each memory component 312 includes information or data that is readable, when activated or powered, in order to provide secure access to a different financial account of a user. Thus, in this way, the device 300 facilitates swapping out the mini smart card 310 in order to replace old, expired, or compromised accounts with new accounts, and/or to expand on the currently-accessible accounts to obviate the need to purchase additional financial cards to support such additional financial accounts.

Figure 4A:
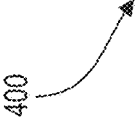
FIG. 4A is a device shaped to function as a ring that incorporates mini smart card features according to various embodiments.
Figure 4B:
FIG. 4B is an exploded, perspective view of the device of FIG. 4A, illustrating how individual mini smart cards are insertable according to at least one embodiment.
Figure 4C:
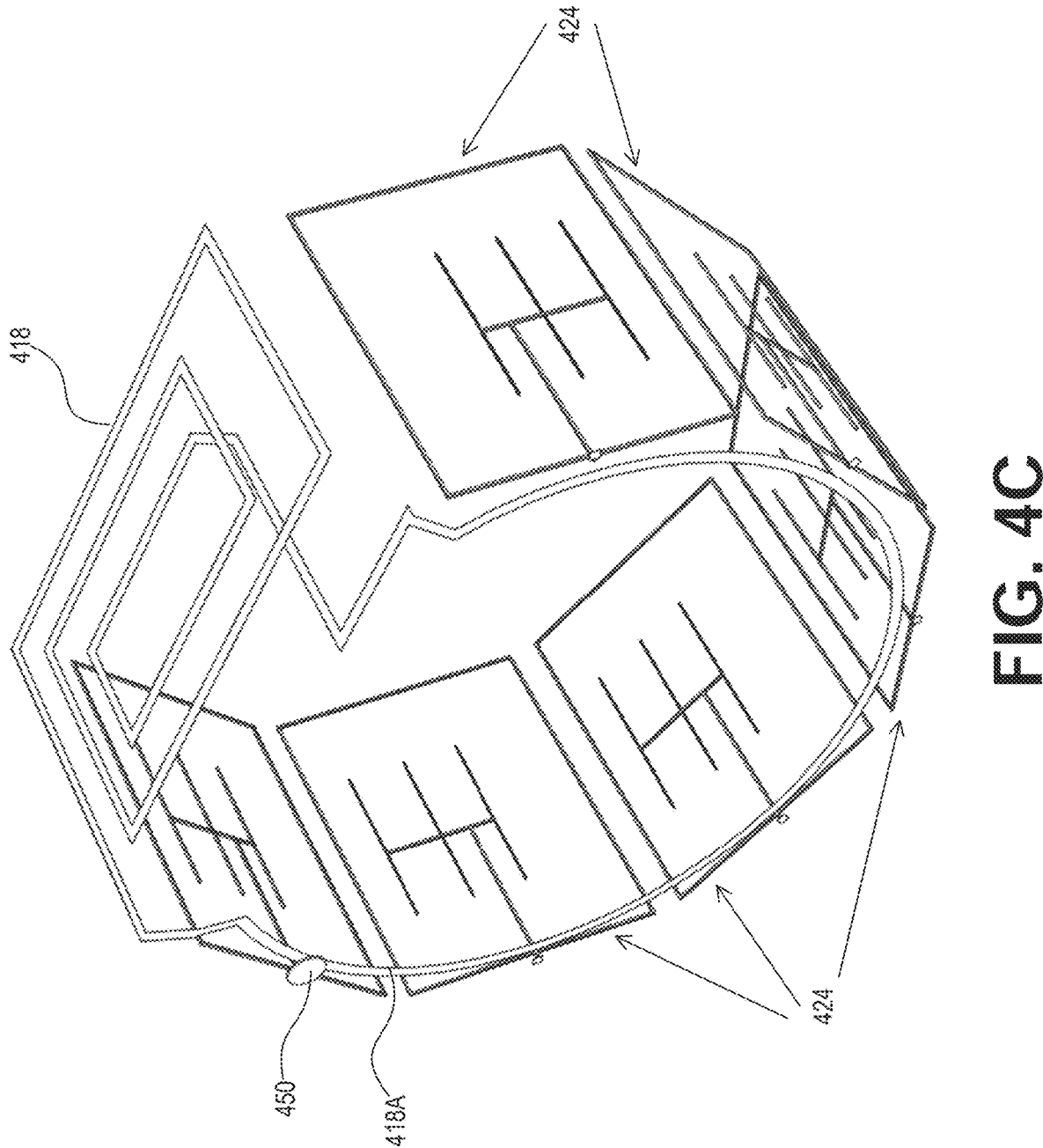
FIG. 4C is a perspective view of communication circuitry of the device of FIG. 4A that makes possible contactless reading of multiple mini smart cards according to at least one embodiment.

FIG. 4A is a device 400 (or apparatus) shaped to function as a ring that incorporates mini smart card features according to various embodiments. FIG. 4B is an exploded, perspective view of the device of FIG. 4A, illustrating how individual mini smart cards are insertable according to at least one embodiment. FIG. 4C is a perspective view of communication circuitry of the device of FIG. 4A that makes possible contactless reading of multiple mini smart cards according to at least one embodiment. In some embodiments, the device 400 includes a housing 402 with a top surface 404 and multiple side surfaces 406, e.g., that connect in a circle or a semi-circle into a ring shape. In embodiments, the housing 302 includes multiple slots 426, one slot 426 for each side of the ring-shaped housing 402.

In various embodiments, the device 400 includes a plurality of mini smart cards 410 that are slidably insertable into a respective slot 426 of the multiple slots 426. In embodiments, each mini smart card 410 includes at least one IC chip 420 on a first side (e.g., an inside) and a first metal coil 428 on a second side (e.g., an outside) of the mini smart card 410. In these embodiments, the device 400 includes a plurality of antennas 424, each antennas embedded in a side of the ring-shaped housing 402. In these embodiments, each antenna 424 is located proximate to a corresponding mini smart card 410 assuming the mini smart card 410 is inserted into one of the slots 426.

In these embodiments, an antenna coil 418 is disposed on the top surface 404 of the housing 402 and is coupled to a communication interface trace 418A that is disposed along an edge of the ring-shaped housing 402 that circumvents the sides 406 of the housing 402. In embodiments, the device 400 further includes a selector dish 450 that is slidable along the communication interface trace 418A to a selected position that electrically couples one of the antennas 424 (FIG. 4C) to the communication interface trace 418A and thus also to the antenna coil 418 disposed on the top surface 404 (FIGS. 4A-4B). In this way, the financial account data on one of the mini smart cards 410 is selectively communicated from the IC chip 420 on that mini smart card 410, through its first metal coil 428, the communication interface trace 418A, and ultimately through the antenna coil 418 to electromagnetically communicate (e.g., via induction technology such as RFID/NFC) with a transaction terminal to which the device 400 is bought near to facilitate the electromagnetic communication using the financial account stored in the IC chip 420.

In embodiments, each of the first metal coils 428 and the antenna coil 318 includes multiple concentric coils that function as an antenna at a particular length to match in wireless frequency. In embodiments, to electromagnetically communicate includes employing NFC or RFID communication, or other type of contactless communication, such as EMV reading technology with reference to any IC chip 420 residing on a mini smart card.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or embodiment unless described as such. One or more implementations or embodiments described herein may be combined in a particular implementation or embodiment. The terms "first," "second," "third," "fourth," or the like as used herein are meant as labels to distinguish among different elements and may not necessarily have an ordinal meaning according to their numerical designation. When the term "about" or "approximately" is used herein, this is intended to mean that the nominal value presented is precise within ±10%.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device comprising:

a housing being open at ends thereof and comprising a cutout region;

a circular band; and a plurality of card holders attached to the circular band, each comprising a cavity to hold a mini smart card having an integrated circuit (IC) chip disposed on a first side and a first metal coil disposed on a second side of the mini smart card, wherein the circular band and the plurality of card holders are configured to slidably pass through the housing such that a respective card holder of the plurality of card holders is retained at the cutout region within the housing.

2. The device of claim 1, further comprising a plurality of mini smart cards, wherein each mini smart card of the plurality of mini smart cards is located within one of the plurality of card holders and stores information on the IC chip associated with a different financial account.

3. The device of claim 1, wherein the circular band comprises a first ring and a second ring, wherein a first side of the plurality of card holders is attached to the first ring and a second side of the plurality of card holders is attached to a second ring.

4. The device of claim 1, further comprising a second metal coil disposed on a top of the housing, the second metal coil to electromagnetically communicate with the first metal coil of a respective mini smart card within the respective card holder to activate a financial account that resides within the IC chip of the respective mini smart card.

* * * * *